United States Patent
Englot et al.

(10) Patent No.: US 11,958,579 B2
(45) Date of Patent: Apr. 16, 2024

(54) SYSTEM AND METHOD FOR AUTONOMOUS EXPLORATION FOR MAPPING UNDERWATER ENVIRONMENTS

(71) Applicants: Schlumberger Technology Corporation, Sugarland, TX (US); Massachusetts Institute of Technology, Cambridge, MA (US)

(72) Inventors: Brendan J. Englot, New York, NY (US); Jinkun Wang, Secaucus, NJ (US); Tixiao Shan, Forest Hills, NY (US); Timothy Paul Osedach, Medford, MA (US)

(73) Assignees: Schlumberger Technology Corporation, Sugarland, TX (US); Massachusetts Institute of Technology, Cambridge, MA (US)

( * ) Notice: Subject to any disclaimer, the term of this patent is extended or adjusted under 35 U.S.C. 154(b) by 708 days.

(21) Appl. No.: 16/943,520

(22) Filed: Jul. 30, 2020

(65) Prior Publication Data
US 2021/0031891 A1    Feb. 4, 2021

Related U.S. Application Data

(60) Provisional application No. 62/880,293, filed on Jul. 30, 2019.

(51) Int. Cl.
*G06T 7/579* (2017.01)
*B63C 11/48* (2006.01)
(Continued)

(52) U.S. Cl.
CPC .............. *B63G 8/001* (2013.01); *B63C 11/48* (2013.01); *G01S 15/89* (2013.01); *G06T 7/143* (2017.01);
(Continued)

(58) Field of Classification Search
CPC ... B63C 11/48; B63G 2008/004; B63G 8/001; G01S 15/89; G06T 7/143; G06T 7/579; G06T 7/73
See application file for complete search history.

(56) References Cited

U.S. PATENT DOCUMENTS

| 10,394,327 B2 * | 8/2019 | Chizeck | G06T 7/97 |
| 2014/0025356 A1 * | 1/2014 | Kosko | G06F 17/10 |
| | | | 703/2 |

(Continued)

FOREIGN PATENT DOCUMENTS

| DE | 102016116471 A1 * | 3/2018 | G01C 21/04 |
| EP | 3168704 B1 * | 2/2021 | B64C 39/024 |

OTHER PUBLICATIONS

Bourgault, F., "Information Based Adaptive Robotic Exploration," IEEE/RSJ International Conference on Intelligent Robots and Systems, Lausanne, Switzerland, vol. 1, pp. 540-545, (2002).
(Continued)

*Primary Examiner* — Vivek D Koppikar
*Assistant Examiner* — Farhad Dawodi
(74) *Attorney, Agent, or Firm* — Mark H. Whittenberger; Holland & Knight LLP

(57) ABSTRACT

Embodiments of the present disclosure are directed towards a system and method for performing an inspection of an underwater environment. Embodiments may include providing an autonomous underwater vehicle ("AUV") and performing an inspection of an underwater environment using the AUV. Embodiments may further include acquiring real-time sensor data during the inspection of the underwater environment and applying an active simultaneous localization and mapping ("SLAM") algorithm during the inspection, wherein applying includes estimating one or more
(Continued)

virtual landmarks based upon, at least in part, at least one past measurement and a current estimate of AUV activity.

14 Claims, 9 Drawing Sheets

(51) Int. Cl.
　　*B63G 8/00*　　　(2006.01)
　　*G01S 15/89*　　(2006.01)
　　*G06T 7/143*　　(2017.01)
　　*G06T 7/73*　　　(2017.01)

(52) U.S. Cl.
　　CPC .............. *G06T 7/579* (2017.01); *G06T 7/73* (2017.01); *B63G 2008/004* (2013.01)

(56) References Cited

U.S. PATENT DOCUMENTS

| | | | | |
|---|---|---|---|---|
| 2014/0300885 | A1* | 10/2014 | Debrunner | G01S 17/42 356/4.01 |
| 2019/0390969 | A1* | 12/2019 | Lermusiaux | G01C 21/203 |
| 2021/0318696 | A1* | 10/2021 | Koch | G08G 5/0069 |

OTHER PUBLICATIONS

Carrillo, Y. et al., "On the Monotonicity of Optimality Criteria during Exploration in Active Slam", IEEE International Conference on Robotics and Automation (ICRA), Washington State Convention Center, Seattle, WA May 26-30, 2015, Institute of Electrical and Electronics Engineers, Inc., pp. 1476-1483.

Dellaert, F. et al., "Square Room SAM: Simultaneous Localization and Mapping via Square Root Information Smoothing" The International Journal of Robotics Research, vol. 25, (2006), 32 pages.

Hernandez, J. D. et al., "Online motion planning for unexplored underwater environments using autonomous underwater vehicles", Journal of Field Robotics, vol. 36, Issue 2, (2019), 56 pages.

Julian, B. J. et al., "On mutual information-based control of range sensing robots for mapping applications", The International Journal of Robotics Research, vol. 33, No. 10, (2014), pp. 1375-1392.

Kaess, M. et al., "Covariance Recovery from a Square Root Information Matrix for Data Association", Robotics and Autonomous Systems, vol. 57, (2009), 15 pages.

Palomeras, N. et al., "Autonomous Mapping of Underwater 3-D Structures: From View Planning to Execution", IEEE Robotics and Automation Letters, vol. 3, No. 3, Jul. 2018, pp. 1965-1971.

Palomeras, N. et al., "Autonomous Exploration of Complex Underwater Environments Using a Probabilistic Next-Best-View Planner", IEEE Robotics and Automation Letters, vol. 4, No. 2, Apr. 2019, pp. 1619-1625.

Stachniss, C. et al. "Information Gain-Based Exploration Using Rao-Blackwellized Particle Filters", Robotics: Science and Systems, (2005), 8 pages.

Vidal, E. et al., "Online View Planning for Inspecting Unexplored Underwater Structures", IEEE Robotics and Automation Letters, vol. 2, No. 3, Jul. 2017, pp. 1436-1443.

Wang, J. et al., "Autonomous Exploration with Expectation-Maximization", International Symposium on Robotics Research, vol. 16, (1997), 16 pages.

Wang, J. et al., "Virtual Maps for Autonomous Exploration with Pose Slam", IEEE/RSJ International Conference on Intelligent Robots and Systems (in preparation), (2019), 8 pages.

Yamauchi, B., "A Frontier-Based Approach for Autonomous Exploration", Navy Center for Applied Research in Artificial Intelligence, Naval Research Laboratory, Washington, DC, Computational Intelligence in Robotics and Automation, (1997), 6 pages.

* cited by examiner

SYSTEM AND METHOD FOR AUTONOMOUS EXPLORATION FOR MAPPING UNDERWATER ENVIRONMENTS

RELATED APPLICATIONS

The subject application claims the benefit of U.S. Provisional Patent Application with Ser. No. 62/880,293, filed 30 Jul. 2019, the entire content of which are herein incorporated by reference.

FIELD OF THE INVENTION

This application relates to systems and methods for using autonomous vehicles in underwater environments.

BACKGROUND

Inspection of underwater assets, such as drill centers, is an important business related to subsea oil and gas operations. This business generally entails the deployment of underwater vehicles to approach individual assets (subsea pipelines, compressors, manifolds, etc.) and to acquire camera imagery and/or other sensor measurements that allow their state to be assessed. Today, inspections of this kind are performed by human divers or remotely operated vehicles (ROVs) that are tethered to support vessels on the surface.

SUMMARY

In an implementation of the present disclosure a method for performing an inspection of an underwater environment. The method may include providing an autonomous underwater vehicle ("AUV") and performing an inspection of an underwater environment using the AUV. The method may further include acquiring real-time sensor data during the inspection of the underwater environment and applying an active simultaneous localization and mapping ("SLAM") algorithm during the inspection, wherein applying includes estimating one or more virtual landmarks based upon, at least in part, at least one past measurement and a current estimate of AUV activity.

One or more of the following features may be included. In some embodiments, the AUV may include a sensor configuration consisting of one or more multibeam sonars, lidars, and cameras. The method may include using one or more fiducial markers to facilitate localization and mapping of an infrastructure by the AUV. The method may also include segmenting three-dimensional ("3D") data associated with the real-time sensor data for at least one of segment, object, and place recognition. The method may also include constructing one or more candidate paths, evaluating candidate paths and selecting a best path, executing the best path, determining termination criteria, and/or if the termination criteria are met completing the mapping. In some embodiments, applying may include applying an Expectation-Maximization exploration algorithm.

In another implementation of the present disclosure a system for performing an inspection of an underwater environment is provided. The system may include an autonomous underwater vehicle ("AUV") configured to perform an inspection of an underwater environment and one or more sensors associated with the AUV configured to acquire real-time sensor data during the inspection of the underwater environment. The system may further include at least one processor associated with the AUV configured to apply an active simultaneous localization and mapping ("SLAM") algorithm during the inspection, wherein applying includes estimating one or more virtual landmarks based upon, at least in part, at least one past measurement and a current estimate of AUV activity.

One or more of the following features may be included. In some embodiments, the one or more sensors may include a sensor configuration consisting of one or more multibeam sonars, lidars, and cameras. The at least one processor may be further configured to use one or more fiducial markers to facilitate localization and mapping of an infrastructure by the AUV. The at least one processor may be further configured to segment three-dimensional ("3D") data associated with the real-time sensor data for at least one of segment, object, and place recognition. The at least one processor may be further configured to construct one or more candidate paths, evaluate the one or more candidate paths and select a best path. The at least one processor may be further configured to execute the best path and determine termination criteria. If the termination criteria are met the at least one processor may be further configured to complete the mapping. Applying may include applying an Expectation-Maximization exploration algorithm.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

The discussion below is directed to certain implementations and/or embodiments. It is to be understood that the discussion below may be used for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

Underwater environments that are occupied by man-made assets, such as oil and gas drill centers, can be highly complex due to clutter, jumpers, pipelines, and other obstacles. For this reason, pre-planned inspection missions that consist of scripted waypoints may not always be reliable for real-time mapping and/or inspection. Embodiments of the present disclosure describe the application of an "active SLAM" algorithm to enable an underwater vehicle to autonomously generate a map of an underwater environment.

Figure 1:
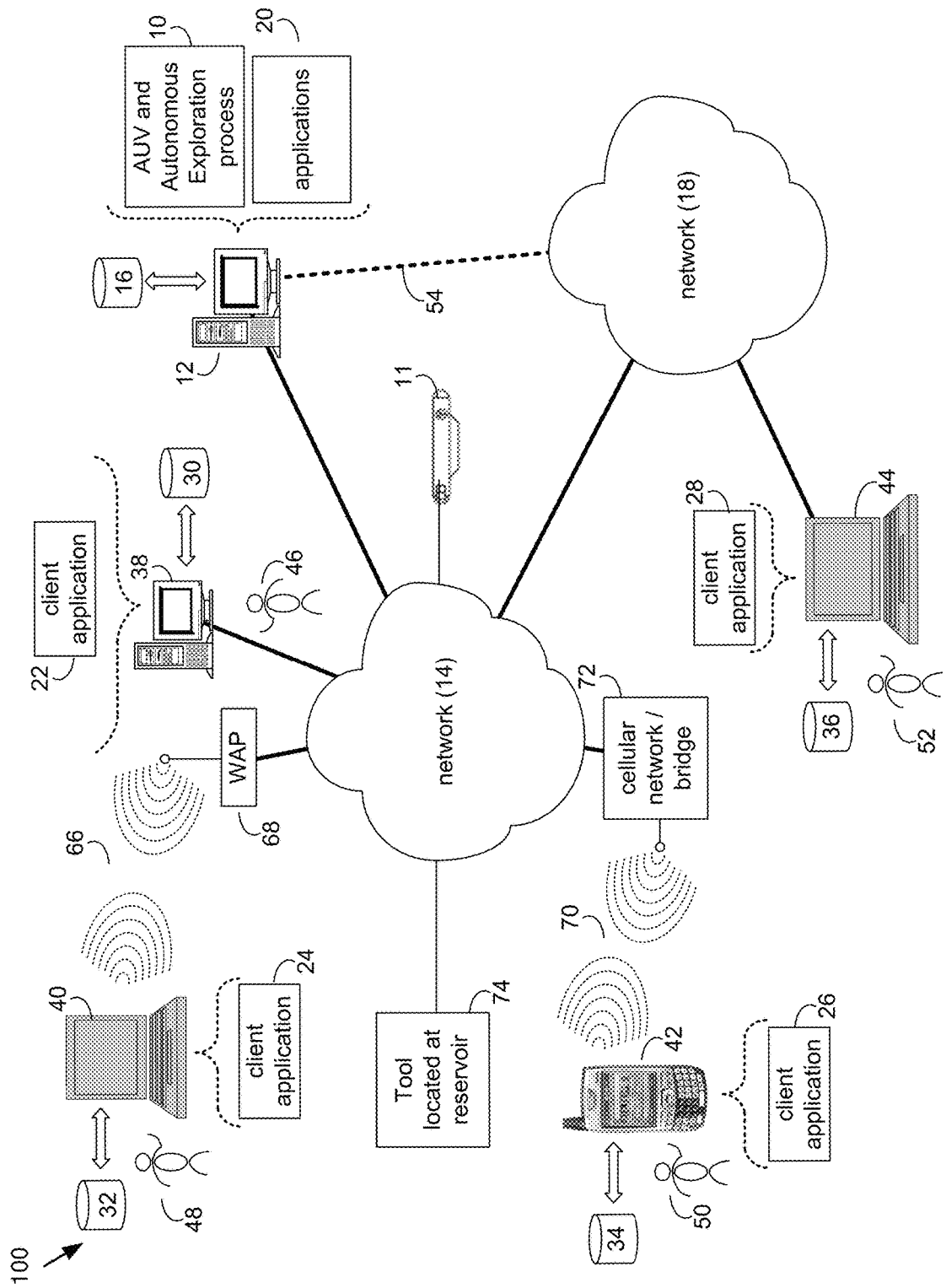
FIG. 1 illustrates a block diagram of an exemplary system for an autonomous exploration process in accordance with embodiments of the present disclosure.

Referring to FIG. 1, there is shown an autonomous exploration process 10 that may reside on and or be associated with an autonomous underwater vehicle ("AUV") 11, which is discussed in further detail in FIGS. 2-9. Aspects of process 10 may be (wholly or partly) executed by server computer 12, which may be connected to network 14 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft® Windows® Server; Novell® NetWare® or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.) Additionally/alternatively, autonomous exploration process 10 may reside on and be executed, in whole or in part, by AUV 11, a client electronic device, such as a personal computer, notebook computer, personal digital assistant, or the like.

The instruction sets and subroutines of autonomous exploration process 10, which may include one or more software modules, and which may be stored on storage device 16 coupled to server computer 12, may be executed by one or more processors (not shown) and one or more memory modules (not shown) incorporated into server computer 12. Storage device 16 may include but is not limited to: a hard disk drive; a solid state drive, a tape drive; an optical drive; a RAID array; a random access memory (RAM); and a read-only memory (ROM). Storage device 16 may include various types of files and file types.

Server computer 12 may execute a web server application, examples of which may include but are not limited to: Microsoft IIS, Novell Webserver™, or Apache® Webserver, that allows for HTTP (i.e., HyperText Transfer Protocol) access to server computer 12 via network 14 (Webserver is a trademark of Novell Corporation in the United States, other countries, or both; and Apache is a registered trademark of Apache Software Foundation in the United States, other countries, or both). Network 14 may be connected to one or more secondary networks (e.g., network 18), examples of which may include but are not limited to: a local area network; a wide area network; or an intranet, for example.

Autonomous exploration process 10 may be a stand alone application, or may be an applet/application/script that may interact with and/or be executed within application 20. In addition/as an alternative to being a server-side process, autonomous exploration process 10 may be a client-side process (not shown) that may reside on a client electronic device (described below) and may interact with a client application (e.g., one or more of client applications 22, 24, 26, 28). Further, autonomous exploration process 10 may be a hybrid server-side/client-side process that may interact with application 20 and a client application (e.g., one or more of client applications 22, 24, 26, 28). As such, autonomous exploration process 10 may reside, in whole, or in part, on server computer 12 and/or one or more client electronic devices.

The instruction sets and subroutines of application 20, which may be stored on storage device 16 coupled to server computer 12 may be executed by one or more processors (not shown) and one or more memory modules (not shown) incorporated into server computer 12.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory modules (not shown) incorporated into client electronic devices 38, 40, 42, 44 (respectively). Storage devices 30, 32, 34, 36 may include but are not limited to: hard disk drives; solid state drives, tape drives; optical drives; RAID arrays; random access memories (RAM); read-only memories (ROM), compact flash (CF) storage devices, secure digital (SD) storage devices, and a memory stick storage devices. Examples of client electronic devices 38, 40, 42, 44 may include, but are not limited to, personal computer 38, laptop computer 40, mobile computing device 42 (such as a smart phone, netbook, or the like), notebook computer 44, for example. Using client applications 22, 24, 26, 28, users 46, 48, 50, 52 may access autonomous exploration process 10.

Users 46, 48, 50, 52 may access autonomous exploration process 10 and/or other applications associated with server computer 12 directly through the device on which the client application (e.g., client applications 22, 24, 26, 28) is executed, namely client electronic devices 38, 40, 42, 44, for example. Users 46, 48, 50, 52 may access process 10 and/or other applications directly through network 14 or through secondary network 18. Further, server computer 12 (i.e., the computer that executes these applications) may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 66 established between laptop computer 40 and wireless access point (i.e., WAP) 68, which is shown directly coupled to network 14. WAP 68 may be, for example, an IEEE 802.11a, 802.11b, 802.11g, Wi-Fi, and/or Bluetooth device that is capable of establishing wireless communication channel 66 between laptop computer 40 and WAP 68. Mobile computing device 42 is shown wirelessly coupled to network 14 via wireless communication channel 70 established between mobile computing device 42 and cellular network/bridge 72, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows, Microsoft Windows CE®, Red Hat Linux, or other suitable operating system. (Windows CE is a registered trademark of Microsoft Corporation in the United States, other countries, or both.).

In some embodiments, autonomous exploration process 10 may generate an output that may be delivered to one or more onsite tools such as reservoir tool 74, which may be configured to perform one or more reservoir operations. Reservoir tool 74 may include, but is not limited to, those available from the Assignee of the present disclosure. In some embodiments, reservoir tool 74 may include one or more processors configured to receive an output from autonomous exploration process 10 and alter the operations of reservoir tool 74.

Figure 2:
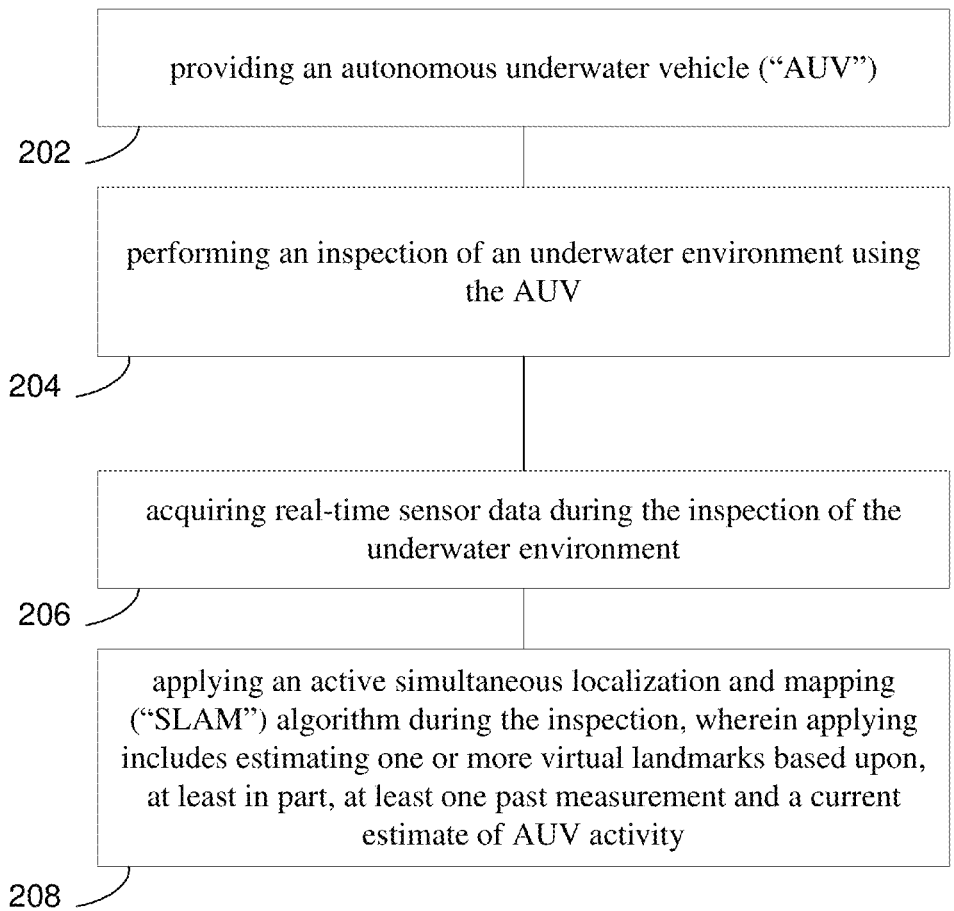
FIG. 2 illustrates a flowchart showing operations consistent with embodiments of the present disclosure.
Figure 3:
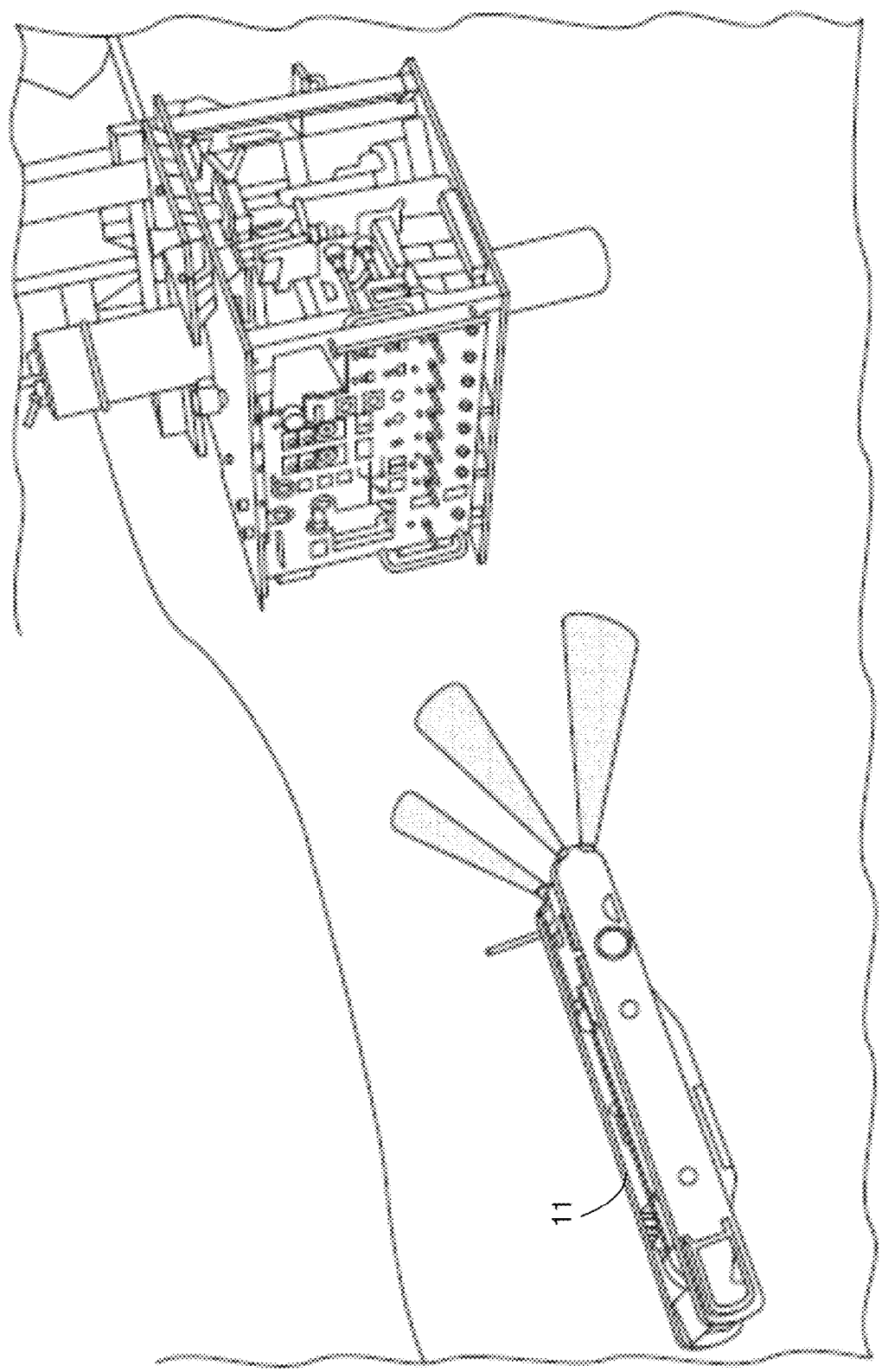
FIG. 3 depicts an example showing a close-up inspection of underwater assets for drill center inspection consistent with embodiments of the present disclosure.

Referring now to FIG. 2, a flowchart 200 consistent with embodiments of autonomous exploration process 10 is provided. Embodiments may include providing (202) an autonomous underwater vehicle ("AUV") and performing (204) an inspection of an underwater environment using the AUV. The method may further include acquiring (206) real-time sensor data during the inspection of the underwater environment and applying (208) an active simultaneous localization and mapping ("SLAM") algorithm during the inspection, wherein applying includes estimating one or more virtual landmarks based upon, at least in part, at least one past measurement and a current estimate of AUV activity. Numerous additional operations are also within the scope of the present disclosure as is discussed in further detail hereinbelow.

Inspection of underwater assets, such as drill centers, is an important business related to subsea oil and gas operations. This business generally entails the deployment of underwater vehicles to approach individual assets (subsea pipelines, compressors, manifolds, etc.) and to acquire camera imagery and/or other sensor measurements that allow their state to be assessed. Today, inspections of this kind are performed by human divers or remotely operated vehicles (ROVs) that are tethered to support vessels on the surface. The ability to perform such inspections with autonomous underwater vehicles (AUVs) is advantageous for several reasons. First, it would eliminate the need for a tether, which would considerably simplify the logistics of deployment and greatly reduce the possibility of the vehicle becoming ensnared by subsea infrastructure—a scenario that would potentially result in the loss of the vehicle or damage to the involved equipment. Second, inspections with AUVs promise to be less expensive than conventional ROV operations as they may require fewer field personnel, a smaller launch and recovery vessel, and a shorter overall mission duration.

In some embodiments, autonomous exploration process 10 may provide the ability to generate detailed 3-dimensional maps of complex underwater environments, such as drill centers. Such maps can serve a variety of purposes. First, they can serve as the basis for several inspection answer products including anomaly detection, change detection, site surveying, and others. Second, they can facilitate navigation by serving as prior maps that vehicles can use to localize themselves.

In some embodiments, mapping of an underwater scene generally involves acquiring measurements with suitable perception means (such as cameras, structured light, sonars, or LiDAR) and then synthesizing these measurements with knowledge about where they were acquired. In the case of an underwater vehicle, the latter may come from state estimates derived from the vehicle's onboard navigation system. The generation of a complete map may require acquisition of sensor measurements from many locations and vehicle orientations to ensure comprehensive coverage of the objects within the environment.

In some mapping applications, it may be adequate to simply fly over the site from a safe distance with the relevant sensors aimed toward the seabed. Other applications, however, may require the vehicle to navigate laterally in the same plane as the assets that are to be mapped or inspected. In this case, careful mission planning and management would be critical to avoid collisions or circumstances that might lead to the vehicle becoming trapped/entangled with objects in the environment. This indeed would be the case when mapping a subsea drill center (e.g., FIG. 3).

Even with a prior map of the site, mission planning and execution could still be challenging and subject to risk. For example, in the case of drill center inspection, 2D or 3D drawings that describe the intended layout for the site may indeed be available, perhaps allowing a human operator to pre-script a series of waypoints to achieve reasonable coverage. Planning such a mission, however, could be a painstaking process that would be subject to human error. Moreover, there is no guarantee that available drawings will ultimately reflect the physical reality of the drill center. It is possible for instance, that assets were misplaced relative to the drawings, or that they have moved do to damage, undocumented intervention, or other external events.

Accordingly, embodiments included herein seek to address the challenges associated with AUV missions to generate maps of underwater environments. The application of a specific algorithm for "autonomous exploration" to the problem of mapping by underwater vehicles is described.

Several algorithms for "autonomous exploration" have been described in the robotics literature over the past several decades. These algorithms generally aim to solve the problem of enabling a robot to decide where to go, given its sensor data and its own partial map of the environment (created through its own exploration). For example, a simple approach is to program the robot to navigate toward the "frontier" of its map, where unexplored terrain meets with explored terrain, and to repeat this process until the entire map is revealed. A more sophisticated approach is to assign a random variable to each pixel (or voxel) in the map, representing its probability of occupancy. The robot is then programmed to choose sensing actions that minimize the Shannon Entropy of the map (or, equivalently, maximize information gain):

$$H(m) = \sum_i \sum_j p(m_{i,j}) \cdot \log p(m_{i,j})$$

This approach is mathematically proven to allow a robot to eliminate entropy from the map.

The previously mentioned approaches are limited, however, in that they do not account for the growth of localization uncertainty as the robot moves through the environment. A poor localization estimate will, in general, lead to a distorted map. Inevitably, drift of navigation sensors will cause the error of the localization estimate to grow over time. This is especially a concern in the underwater domain where access to an absolute positioning system, such as USBL or LBL positioning systems (equivalent to GPS, but for use underwater), may not be readily available.

A class of algorithms have been explored that aim to incentivize the robot to explore its environment while simultaneously managing the growth of its localization uncertainty. Error can be limited, for example, by identifying and periodically re-observing features in the environment that can be used as navigation landmarks. If the localization uncertainty becomes too large at a given point, for example, the robot may choose a sensing action that will enable it to re-observe a previously identified landmark rather than to proceed into an unexplored part of the map. The tradeoff between exploration and minimizing localization error can be represented by a utility function, calculated for each potential sensing action, a:

$$U(a) = \alpha \cdot \phi(\Sigma_x | a) + \beta \cdot I(m; a)$$

The first term corresponds to localization error while the latter term corresponds to map information gain. Φ represents the uncertainty criterion and the parameters α and β allow this tradeoff to be tuned to suit a given mapping task.

A limitation of this type of approach is that it ultimately does not ensure that the resulting map will be accurate. An "Expectation-Maximization" algorithm, as discussed herein, was developed specifically for this purpose. In this case, the utility function explicitly addresses map accuracy by penalizing landmark location covariance:

$$U = \sum_{l_i \in \mathcal{L}} \phi(\sum_{l_i})$$

Embodiments of the present disclosure are directed towards an "active SLAM" algorithm, such as an E-M Exploration algorithm, that may be used in the context of underwater vehicles. In some embodiments, and with regards to the Expectation-Maximization Algorithm, for a given sets of robot poses, X, landmarks, L, and measurements, Z, the solution to the SLAM problem (X* and L*) is obtained by maximizing the joint probability distribution:

$$X^*, L^* = \operatorname{argmax} \log P(X, L, Z)$$

In the case of active SLAM, however, the landmarks are not known a priori. Therefore, the concept of virtual landmarks, V, is introduced. The phrase "virtual landmark", as used herein, may represent random variables that describe landmarks that may be discovered as the robot explores its environment. The solution to the SLAM problem may then be written:

$$X^* = \operatorname{argmax} \log P(X, Z) = \operatorname{argmax} \log \sum_V P(X, Z, V)$$

In some embodiments, the presence of unobserved variables in this equation may be addressed by an "expectation-maximization" approach. In the Expectation Step, virtual landmarks may be estimated given past measurements and the current estimate of vehicle actions. In the Maximization Step, a new trajectory may be selected such that the expected value of joint probability, given the virtual landmark distributions, is maximized. This entails first constructing candidate paths for the vehicle and then propagating robot pose uncertainty along each path. The uncertainty of virtual landmarks resulting from candidate paths may then be evaluated. The "best" path may then be determined based on a utility function and then executed by the vehicle:

$$a^* = \operatorname{argmin} U + \alpha \cdot C$$

Here, a* is the "best" action, U is the utility function, α is a tuning parameter, and C is a function that penalizes longer paths. The utility function may be approximated:

$$U = \sum_{l_i \in \mathcal{L}} \phi(\sum_{l_i}) \approx \sum_{v_k \in V} \phi(\sum_{v_k})$$

Figure 4:
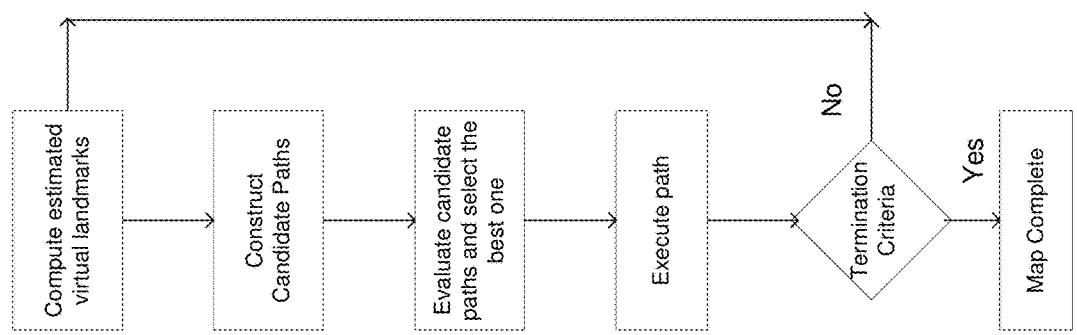
FIG. 4 depicts a flowchart of an expectation-maximization algorithm for autonomous exploration consistent with embodiments of the present disclosure.

In some embodiments, after executing the selected path, the process repeats until a termination criterion is reached. For example, the landmark uncertainties in each cell of the map may be required to be below a specified threshold. This process is represented in FIG. 4. Note that the vehicle continues to acquire sensor data continuously throughout this process. More detailed mathematical treatments of the EM-Exploration algorithm may be found in J. Wang and B. Englot, "Autonomous exploration with Expectation-Maximization", International Symposium on Robotics Research, vol. 16, 2017.

Embodiments of the present disclosure describe the application of an active SLAM algorithm to the problem of underwater inspection. Active SLAM entails path-planning based on the map and localization estimates derived from a real-time SLAM algorithm. An important requirement of active SLAM is that the accuracies of the map and localization estimates are explicitly quantified and accounted for in the algorithm. This may be important for underwater or drill center inspection as missions may last several hours, potentially resulting in significant drift of the vehicle's navigation system. An example of such an algorithm is the Expectation-Maximization Exploration (EM-Exploration) algorithm, which is described in further detail hereinbelow.

In some embodiments, in order to implement autonomous exploration in an underwater environment, the underwater vehicle must be equipped with a suitable perception system including one or more sensors. One embodiment would entail the use of a multibeam profiling sonar mounted in a "horizontal" configuration (FIG. 5A). Multibeam sonars can scan wide swaths (>120-deg) and at longs ranges (>50 m), making them conducive to rapid exploration of the environment. The inclusion of several multibeam sonars can allow even greater coverage of the environment (FIG. 5B). A vertically oriented multibeam sonar or hybrid configuration consisting of both horizontal and vertical sonars (FIG. 5C) may be advantageous if three-dimensional exploration is required. Accuracy in terms of range and azimuth, however, may be limited relative to laser-based sensing modalities. Additionally, sonar measurements are subject to artifacts such as multipath reflection, which complicate their interpretation. An alternative embodiment would entail the use of one or more underwater lidar systems mounted to the vehicle (for example, FIG. 5D). Time-of-flight lidar systems generally entail sweeping a laser vertically and horizontally, allowing them to generate dense 3D point clouds of the local environment with much higher accuracy than sonar (although generally with shorter range due to scattering and optical attenuation). A hybrid system that includes both lidar and sonar could also be advantageous, as the two sensing modalities have complementary strengths and weaknesses (FIG. 5E-F).

Figure 5:
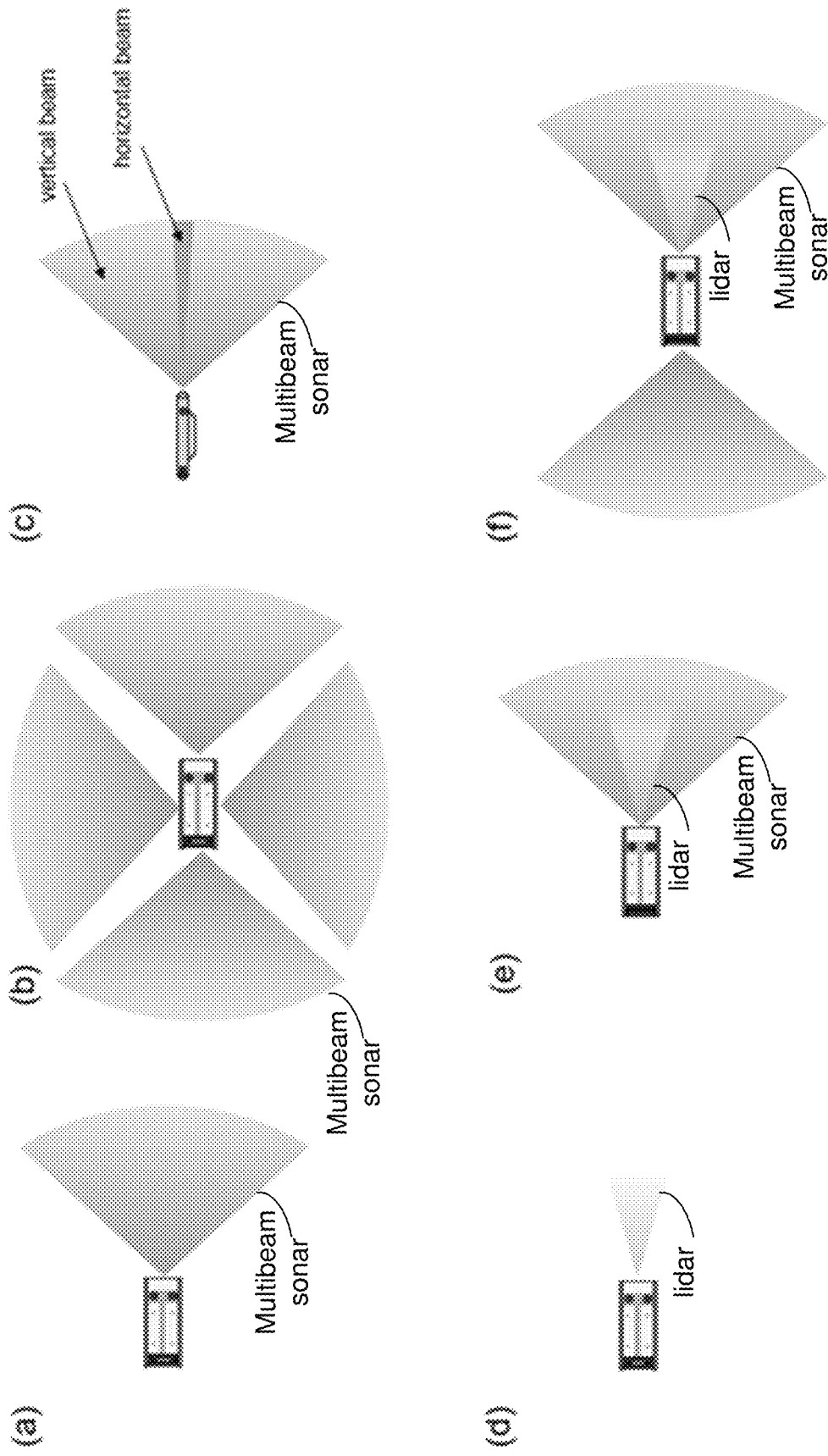
FIG. 5 depicts example sensor configurations consistent with embodiments of the present disclosure.

Although not represented in FIG. 5, other sensing modalities such as structured light camera systems and stereo (or monocular) camera systems can be used to generate suitable perception data.

In some embodiments, a camera system may be used in conjunction with one or more fiducial markers, which may be physically attached to assets in the environment to generate reliable landmark observations that can potentially be incorporated into active SLAM. Additional information regarding fiducial markers may be found in J. Wang and E. Olson, "AprilTag 2: Efficient and robust fiducial detection", IEEE/RSJ International Conference on Intelligent Robots and Systems, 2016.

Figure 6:
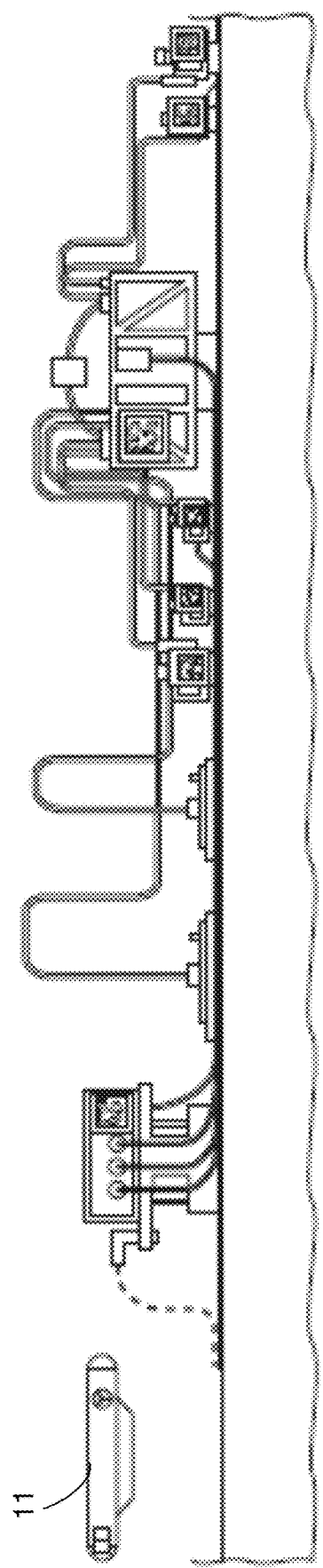
FIG. 6 depicts an example representation of a drill center equipped with fiducial markers consistent with embodiments of the present disclosure.

Referring now to FIG. 6, an example embodiments depicting a subsea drill center outfitted with fiducial markers is provided. On the left, an underwater vehicle 11 equipped with a camera approaches the drill center. Assets are marked with one or more unique fiducial markers allowing their straightforward identification. Poses and tag ids acquired from tag detections generate reliable unambiguous landmarks for SLAM. Such tags can be attached to physical assets at the time of their manufacture/installation or, alternatively, at a later point in the assets' lives by divers or underwater robots. Suitable measures may be required, depending on the depth and specific environment, to prevent biofouling that could reduce the visibility of tags over time.

In some embodiments, potential inputs to an autonomous exploration algorithm may include sonar imagery (intensity as a function of range and azimuth), 3D point cloud data, or otherwise-generated observations of landmark pose (e.g. fiducial markers). The basic building blocks of the perception pipeline are reviewed below. Pre-processing will generally be required to prepare sensor data to be suitable for active SLAM.

In the case of sonar imagery, pre-processing may simply consist of applying an intensity threshold to identify the occupied regions within the image. A more accurate classification can be achieved, however, by incorporating corrections that are based on physical models of the specific sonar as well as the propagation channel. To maximize rejection of artifacts such as multipath, an alternative pre-processing stage that accepts only the closest return for a given azimuth with an intensity beyond a specified threshold may be applied.

Although imagery from a profiling sonar can be regarded as a 2-dimensional "slice" of the scene, it may be extended to 3 dimensions by means of submap generation. This may entail fusing several consecutive sonar scans of the environment with corresponding state estimates from the vehicle's navigation system. The resulting 3-dimensional "submaps" may be incorporated into a graph SLAM implementation in the same manner as other sources of 3D point cloud data, such as lidar.

In some embodiments, it may be necessary to pre-process 3D point cloud data, whether acquired from sonar submapping, lidar, or a camera system. A minimal level of pre-processing might include outlier removal (e.g., via a cluster filtering algorithm).

Figure 7:
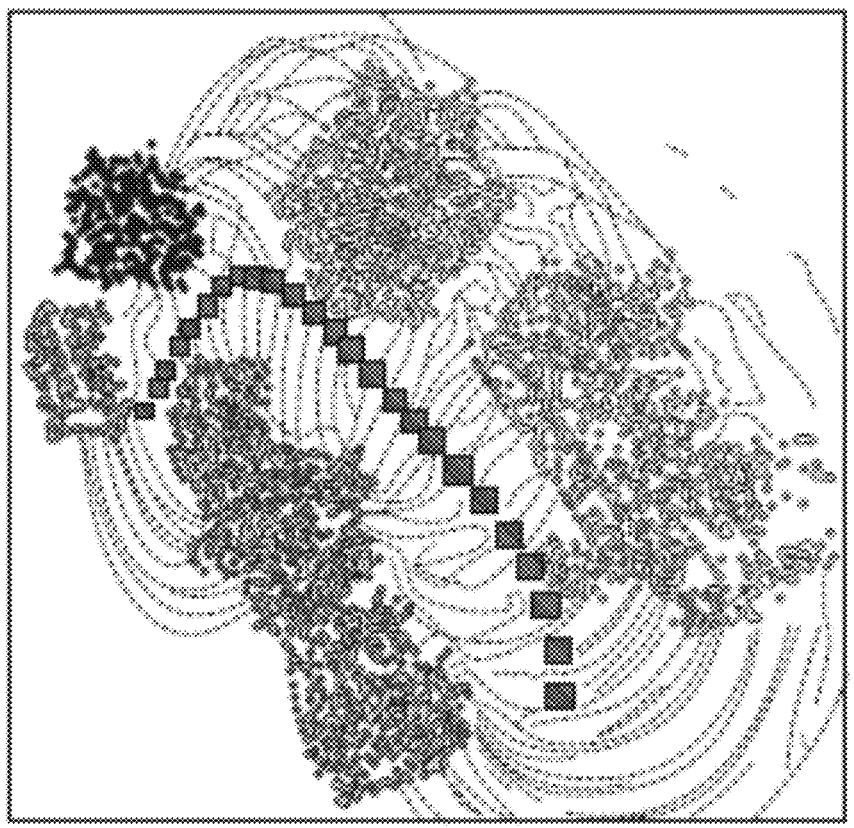
FIG. 7 shows a segmented point cloud after ground removal consistent with embodiments of the present disclosure.
Figure 7:
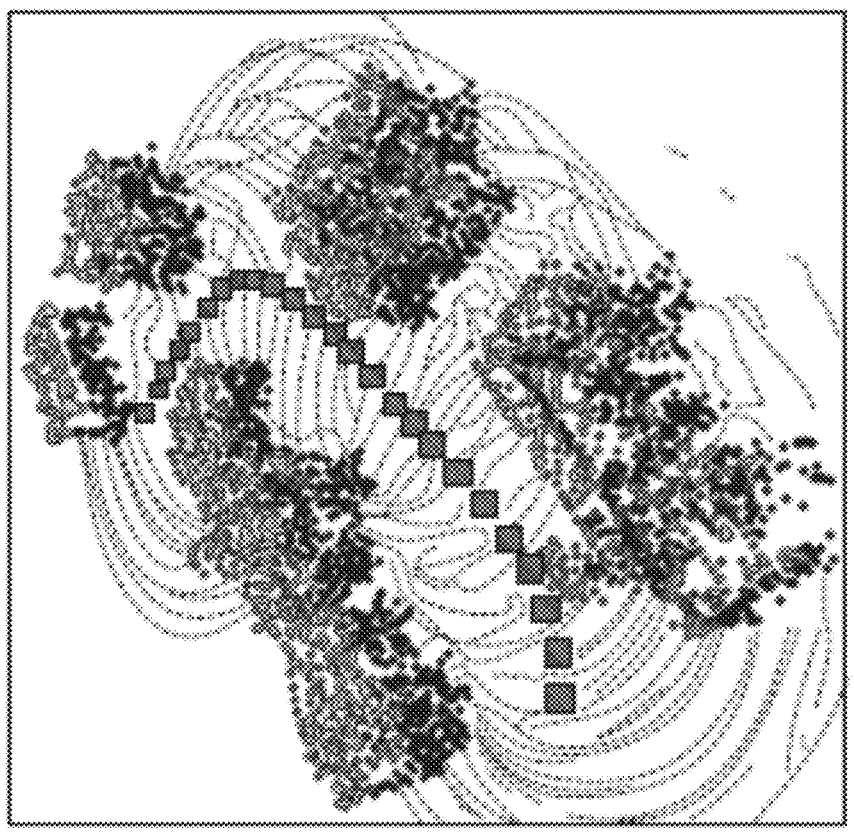

In some embodiments, due to the complexity of 3D point cloud data and the need for reliable place recognition, it may be necessary to segment 3D point cloud data into clusters that can be reasoned about in SLAM as individual landmarks as shown in FIG. 7. Suitable algorithms are described in "An online multi-robot SLAM system for 3D LiDARs", by R. Dube et al, IEEE/RSJ International Conference on Intelligent Robots and Systems, 2017 and in "SegMatch: Segment Based Place Recognition in 3D Point Clouds", by R. Dube et al, IEEE International Conference on Robotics and Automation (ICRA), 2017. It should be noted that these are provided merely by way of example and any suitable algorithm may be employed without departing from the scope of the present disclosure.

In some embodiments, autonomous exploration process 10 may perform segmentation of dense 3D point cloud data and the instantiation of segment-matching constraints in a factor graph (described below). These techniques are well-suited for this application, however, as the sea-floor can generally be assumed to be flat (facilitating its straightforward removal from 3D point cloud data) and assets comprising a drill center readily lend themselves to segmentation.

In the process of performing an underwater inspection, there may be scenarios in which useful perception data is not available (e.g., when exploring a region of the map that happens to be devoid of any objects). One of the advantages of the present disclosure is that the negative impact of such a scenario on map accuracy (e.g., due to growing vehicle localization error) would inherently be addressed. More specifically, an active SLAM algorithm such as EM-Exploration would induce the vehicle to periodically revisit known landmarks, bounding the growth of its localization uncertainty, as it explores feature-sparse regions.

In some embodiments, a fundamental requirement for the implementation of an autonomous exploration algorithm is a suitable SLAM framework that can be used to predict the resulting uncertainty of future robot poses if a sequence of sensing actions is performed. Such a framework might incorporate any number of factors, depending on the vehicle's sensor configuration.

Figure 8:
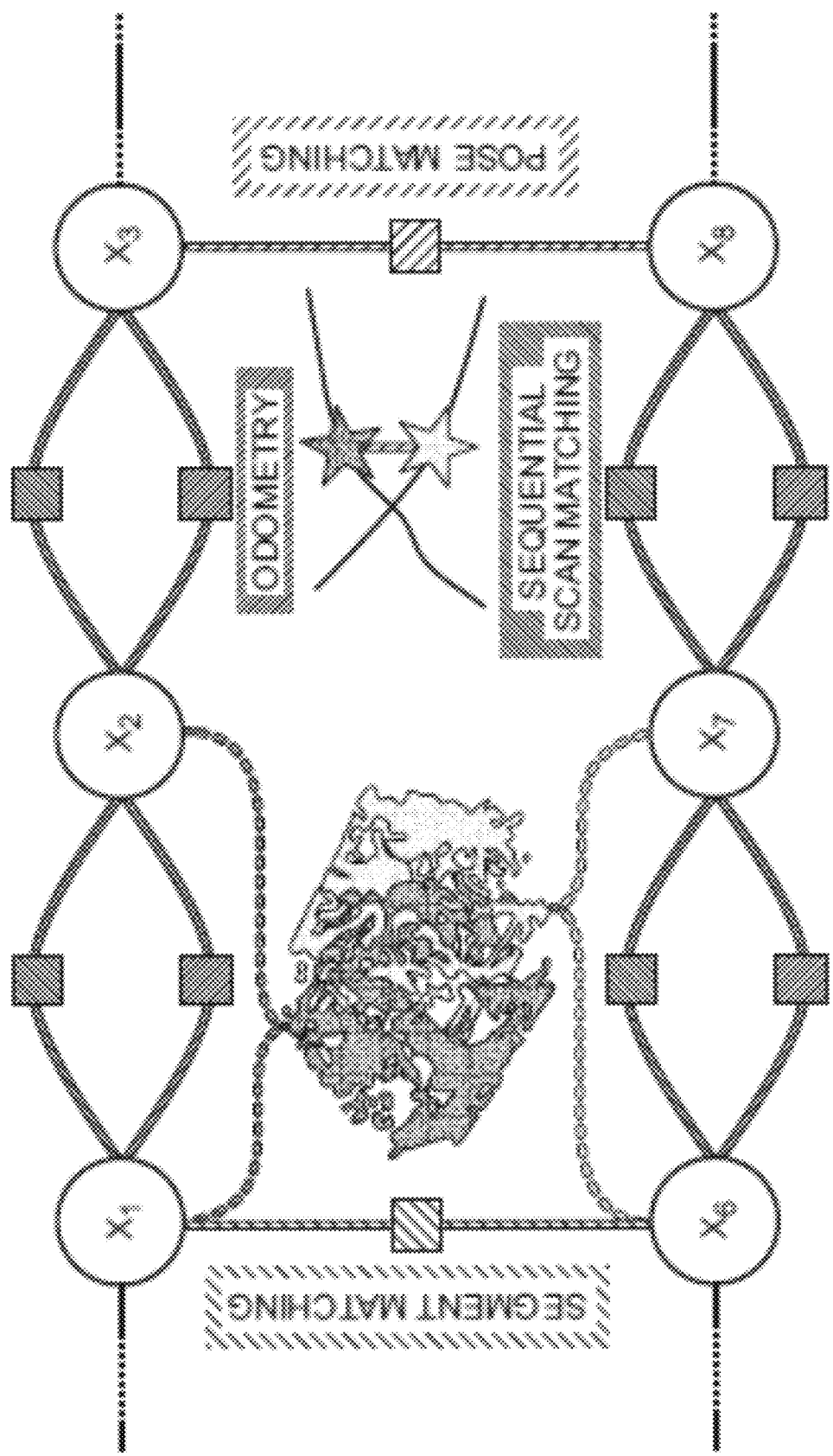
FIG. 8 shows a SLAM formulation for autonomous exploration consistent with embodiments of the present disclosure.

One example SLAM framework, demonstrated in the context of an unmanned ground vehicle (UGV), is shown in FIG. 8. The factor graph includes sequential factors from odometry, sequential scan matching, place recognition, and pose matching. The backbone of the pose graph may be composed of two sequential factors: The odometry factor ($f^O$) defines the relative motion constraint between two consecutive poses from persistent odometry measurements. Besides odometry, when the robot is equipped with a 3D LiDAR (or sonar), sequential scan matching ($f^{SSM}$) also provides a relative transformation by aligning point clouds observed at two positions. The essential component of graph SLAM to ensure accurate estimation is loop closure, which is incorporated in two ways. First, when the current position of the robot is in the vicinity of a previously visited position, pose matching ($f^{PM}$) is performed by matching two point clouds accumulated around these two positions. Secondly, segment matching ($f^{SM}$) is utilized for loop-closure. An illustration of the segmentation process is shown in FIG. 7. Details of how segmentation and segment association can be performed are elaborated in Sec. III-B of "Virtual Maps for Autonomous Exploration with Pose SLAM", by J. Wang et al, IEEE/RSJ International Conference on Intelligent Robots and Systems, 2019.

Overall, the factor graph can be expressed as:

$$f(\Theta) = f^0(\Theta_0) \prod_i f_i^O(\Theta_i) \prod_j f_j^{SSM}(\Theta_j) \prod_p f_p^{PM}(\Theta_p) \prod_q f_q^{SM}(\Theta_q)$$

where variables $\Theta$ contain 6-DOF robot poses, and every factor $f_i(\Theta_i)$ defines a constraint model on a set of variables $\Theta_i$. The optimization of a factor graph leads to a nonlinear least-squares problem, which can be solved efficiently using any suitable graph SLAM software framework. Sequential scan matching can be performed using the iterative closest point (ICP) algorithm.

Figure 9:
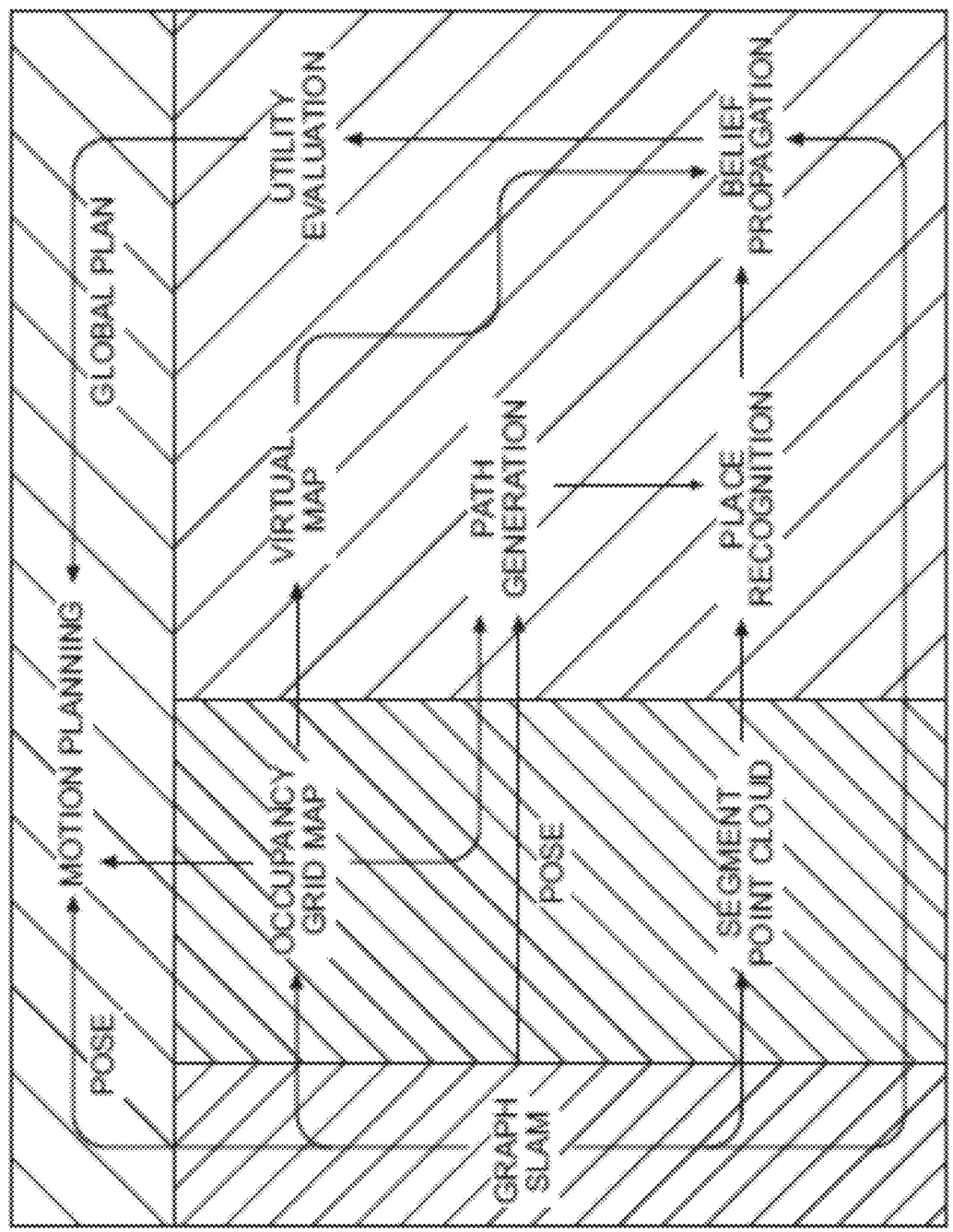
FIG. 9 shows an example EM-exploration algorithm consistent with embodiments of the present disclosure.

Referring now to FIG. 9, an illustration showing in more detail how the EM-Exploration algorithm may be implemented in conjunction with Graph SLAM is provided. Although this architecture was realized for a ground vehicle, a similar architecture may be applied in an underwater vehicle, with the source of 3D point cloud data replaced with equivalent underwater sensors.

Embodiments of the present disclosure include the application of an active simultaneous localization and mapping (SLAM) algorithm to the problem of underwater inspection, including inspection of oil and gas infrastructure. Embodiments may include the application of an Expectation-Maximization exploration algorithm to the problem of underwater inspection, including inspection of oil and gas infrastructure.

In some embodiments, sensor configurations consisting of one or more multibeam sonars, lidars, and/or cameras may be used to enable underwater active SLAM and one or more fiducial markers may be used to facilitate localization and/or mapping of oil and gas infrastructure by an AUV. In some embodiments, the system may include the segmentation of 3D data acquired by underwater sensors for segment, object, and/or place recognition in the context of underwater inspection.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms may be used to distinguish one element from another. For example, a first object or step could be termed a second object or step, and, similarly, a second object or step could be termed a first object or step, without departing from the scope of the disclosure. The first object or step, and the second object or step, are both objects or steps, respectively, but they are not to be considered a same object or step.

The flowchart and block diagrams in the figures illustrate the architecture, functionality, and operation of possible implementations of systems and methods and according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Although a few example embodiments have been described in detail above, those skilled in the art will readily appreciate that many modifications are possible in the example embodiments without materially departing from the scope of the present disclosure, described herein. Accordingly, such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

The computer system may further include a memory such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Having thus described the disclosure of the present application in detail and by reference to embodiments thereof, it will be apparent that modifications and variations are possible without departing from the scope of the disclosure defined in the appended claims.

The invention claimed is:

1. A method for performing an inspection of an underwater environment comprising:
   executing an autonomous exploration, in whole or in part, by an autonomous underwater vehicle ("AUV");
   performing an inspection of an underwater environment using the AUV;
   constructing, by a processor, one or more candidate paths;
   acquiring, by the processor, real-time sensor data during the inspection of the underwater environment;
   applying, by the processor, an active simultaneous localization and mapping ("SLAM") algorithm during the inspection,
      wherein applying includes estimating one or more virtual landmarks based upon, at least in part, at least one past measurement and a current estimate of AUV activity, and
      wherein applying includes applying an Expectation-Maximization exploration algorithm with a utility function explicitly addressing a map accuracy by identifying and periodically re-observing features in the underwater environment for navigating a previously identified virtual landmark of the estimated one or more virtual landmarks;
   evaluating, by the processor, a localization error of the one or more virtual landmarks resulting from the one or more candidate paths; and
   determining, by the processor, a best path based on the localization error and a map information gain represented by the utility function.

2. The method for performing an inspection of an underwater environment of claim 1, wherein the AUV includes a sensor configuration consisting of one or more multibeam sonars, lidars, and cameras.

3. The method for performing an inspection of an underwater environment of claim 1, further comprising:
   using one or more fiducial markers to facilitate localization and mapping of an infrastructure by the AUV.

4. The method for performing an inspection of an underwater environment of claim 1, further comprising:
   segmenting three-dimensional ("3D") data associated with the real-time sensor data for at least one of segment, object, and place recognition.

5. The method for performing an inspection of an underwater environment of claim 1, further comprising:
   executing the best path by the AUV.

6. The method for performing an inspection of an underwater environment of claim 5, further comprising:
   determining termination criteria.

7. The method for performing an inspection of an underwater environment of claim 6, further comprising:
   using one or more fiducial markers to facilitate localization and mapping of an infrastructure by the AUV;
   if the termination criteria are met, completing the mapping.

8. A system for performing an inspection of an underwater environment comprising:

an autonomous underwater vehicle ("AUV") configured to execute an autonomous exploration, in whole or in part, and to perform an inspection of an underwater environment;

one or more sensors associated with the AUV configured to acquire real-time sensor data during the inspection of the underwater environment; and at least one processor associated with the AUV configured to:

construct one or more candidate paths;

apply an active simultaneous localization and mapping ("SLAM") algorithm during the inspection, wherein applying includes estimating one or more virtual landmarks based upon, at least in part, at least one past measurement and a current estimate of AUV activity, and wherein applying includes applying an Expectation-Maximization exploration algorithm with a utility function explicitly addressing a map accuracy by identifying and periodically re-observing features in the underwater environment for navigating a previously identified virtual landmark of the estimated one or more virtual landmarks;

evaluate a localization error of the one or more virtual landmarks resulting from the one or more candidate paths; and determine a best path based on the localization error and a map information gain represented by the utility function.

9. The system for performing an inspection of an underwater environment of claim 8, wherein the one or more sensors includes a sensor configuration consisting of one or more multibeam sonars, lidars, and cameras.

10. The system for performing an inspection of an underwater environment of claim 8, wherein the at least one processor is further configured to use one or more fiducial markers to facilitate localization and mapping of an infrastructure by the AUV.

11. The system for performing an inspection of an underwater environment of claim 8, wherein the at least one processor is further configured to segment three-dimensional ("3D") data associated with the real-time sensor data for at least one of segment, object, and place recognition.

12. The system for performing an inspection of an underwater environment of claim 8, wherein the at least one processor is further configured to execute the best path by the AUV.

13. The system for performing an inspection of an underwater environment of claim 12, wherein the at least one processor is further configured to determine termination criteria.

14. The system for performing an inspection of an underwater environment of claim 13, wherein the at least one processor is further configured to use one or more fiducial markers to facilitate localization and mapping of an infrastructure by the AUV, and wherein if the termination criteria are met, the at least one processor is further configured to complete the mapping.

* * * * *